INVENTOR.
JAMES W. BATCHELDER

INVENTOR.
JAMES W. BATCHELDER
BY Gobrick and Gobrick
ATTORNEYS

Nov. 5, 1957  J. W. BATCHELDER  2,811,876
AUTOMATIC TAPPING AND DRILLING MACHINE
Filed Sept. 7, 1955  9 Sheets-Sheet 6

INVENTOR.
JAMES W. BATCHELDER
BY Golrick and Golrick
ATTORNEYS

Nov. 5, 1957  J. W. BATCHELDER  2,811,876
AUTOMATIC TAPPING AND DRILLING MACHINE
Filed Sept. 7, 1955  9 Sheets-Sheet 7

*INVENTOR.*
JAMES W. BATCHELDER
BY *Gabrick and Gabrick*
ATTORNEYS

Nov. 5, 1957  J. W. BATCHELDER  2,811,876
AUTOMATIC TAPPING AND DRILLING MACHINE
Filed Sept. 7, 1955  9 Sheets-Sheet 8

INVENTOR.
JAMES W. BATCHELDER
BY Golrick and Golrick
ATTORNEYS

2,811,876

AUTOMATIC TAPPING AND DRILLING MACHINE

James W. Batchelder, Ascutney, Vt.

Application September 7, 1955, Serial No. 532,855

20 Claims. (Cl. 77—5)

The present invention relates generally to automatic tapping or drilling machines; more particularly to a machine adapted automatically to present work blanks from a bulk load successively and singly before a rotary cutting tool advanced along a work piece shank axis, for example a drill or tap, to clamp the same in precise desired relation to the cutting tool path of advance, to drill or tap the work piece to chosen depth and after release of the finished work blank to repeat such cycle of operation; and specifically to such a machine operating upon headed work pieces or blanks. Although the invention is adapted to use as a whole for other operations and work pieces than drilling or tapping a headed work blank to form a tubular rivet type fastener, the invention will be described primarily in terms of a flat head rivet, the shank of which is to be drilled or tapped to form a tubular rivet.

In drilling rivet shanks or the like a principle difficulty of prior art machines has been in drilling centrally to the shank for uniformity of the finished tubular rivet wall with no thin spots to crack when the rivet is clinched. Also in prior art machines variations in density of the body or shank resulted in excessive drill breakage under the axial feed thrust of the positive tool feed means used, such as cams or the like. Moreover where a blank has been clamped radially of the shank and a hole drilled or tapped into the clamped section of the shank a difficulty arose in keeping the blank from rotation without applying such radial clamp force as to collapse the drilled or tapped portion onto the tool in the area clamped.

It is a primary object of the invention to provide a machine wherein these difficulties are avoided by providing for radial clamping sufficient to position the work correctly and sequential thereto an axial head clamping as the principle force restraining the work blank from rotation when drilled or tapped. To this end there is used a fixed radial clamping jaw and a spring biased movable jaw jointly forming a work blank radial clamping seat which are cammed apart by an entering work blank to release a preceding finished blank and automatically center the work blank which has entered. Thereafter an axial clamping head moves axially toward the work piece head to clamp the head against the radial jaws. A further object is to provide a form of clamping elements such, and auxiliary clamping element aligning means, as are adapted to adjustment methods whereby the various elements of the machine are quickly, easily and accurately adjusted to insure alignment of a clamp work piece with a tool spindle and accordingly easily attained manufacturing precision. Another object is to overcome excessive drill breakage due to inhomogeneity of work blank material by applying regulated pneumatic pressure as the tool advancing or feeding means and also including control means integrating the actuation of the blank feeding and holding means and pneumatic tool advancing means into an automatic cycle working on successive work blanks.

With respect to speed of operation prior automatic rivet drilling and tapping machines have been relatively slow, a consequence of the type of blank transfer means used with long travel of many constituent elements which at high operating speeds and attendant high positive and negative accelerations would be subjected to unallowably dangerous objectionable stresses. To provide an automatic drilling or tapping machine capable of greatly increased production rates as contrasted with comparable prior machines by use of pneumatic actuating mechanisms with short working strokes and low air consumption is a still further object of this invention.

Other objects and advantages will appear from the following description and drawings wherein.

General organization

Figure 1:
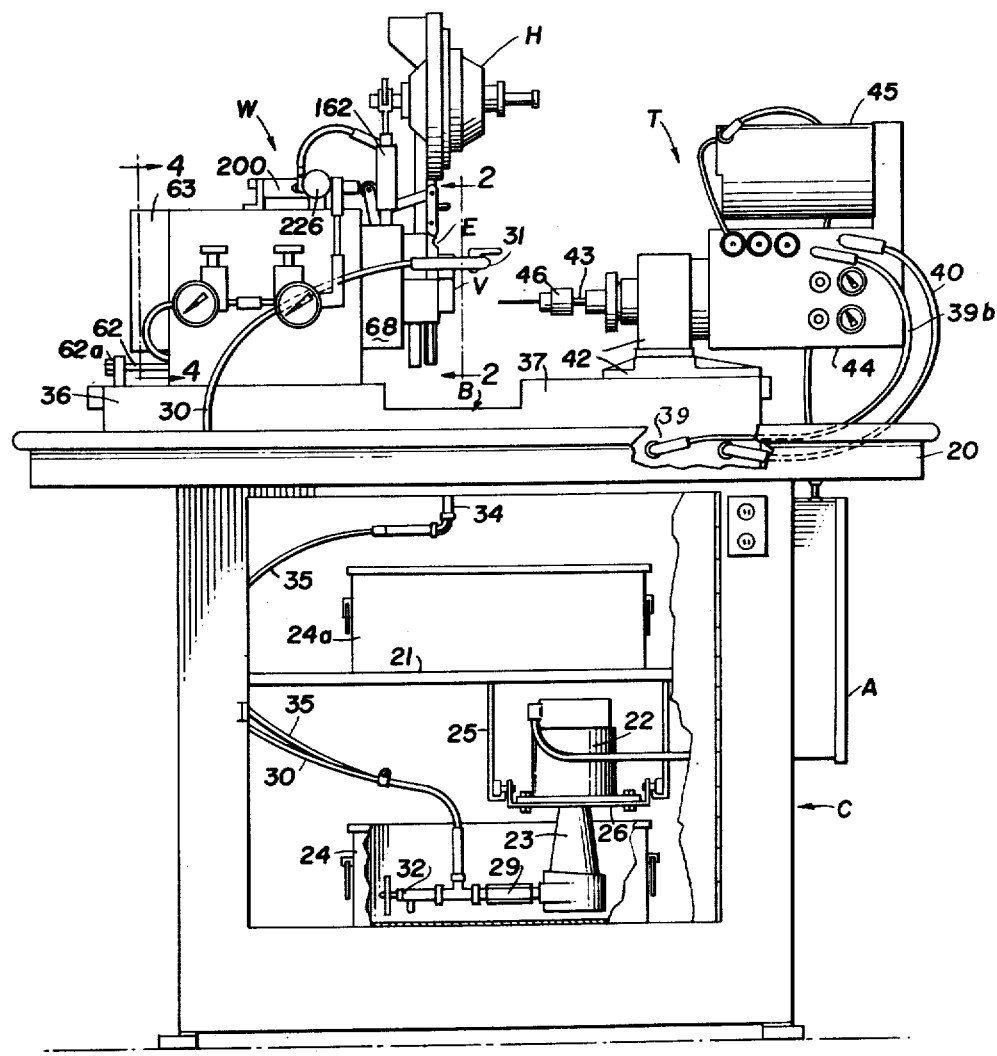
Fig. 1 is a front elevational view of a machine embodying the present invention.

The machine of this invention, the general organization of which is best seen in Fig. 1, comprises at the left side, a work head assembly W including as principal components a hopper type blank feeder H, for receiving work blanks in bulk and delivering them in soldiered fashion, a work clamp vise sub-assembly V for clamping blanks axially and radially by pneumatic means, a work blank escapement mechanism E for receiving blanks from feeder H and presenting them successively to the vise; at the right side a power driven rotary tool assembly T, including a rotatable tool carrying spindle reciprocable by pneumatic power means toward and away from the work clamp vise; a bed B to the top of which the work head assembly and tool assembly are secured, but with provision for slidable adjustment toward each other; and an underframe in form a cabinet C serving as a supporting and work table for the aforementioned components and as an enclosure for certain parts of a cutting or coolant liquid supply means and of electric wiring and controls.

The top part 20 of the supporting structure and coolant system cabinet, providing a generally horizontally extended surface whereon the bed B is bolted, is enclosed peripherally to form a receiver for cutting coolant or lubricant delivered to the work head. The cabinet C may be of any suitable construction to support the aforementioned elements and provides a space accessible through a front cabinet door divided by a shelf member 21 beneath which is located a coolant motor pump unit 22—23 and a coolant reservoir in the form of a removable tray 24. Spaced bracket plates 25 depending from the shelf 21 through rollers and tracks slidably support a base plate 26 on the upper and lower sides of which respectively motor 22 and pump 23 are mounted in vertical axial alignment as a unit. In normal operating position, the centrifugal coolant pump 23 extends down into the tray 24, the bottom end of the pump immersed in coolant having an inlet near the tray bottom.

The coolant pump discharges laterally or horizontally through a check valve 29 to a flexible coolant supply hose 30 running up to a discharge nozzle 31 at the working face of the work head W. The valve 29 prevents back flow of coolant or lubricant when the pump is off to ensure immediate availability of fluid at the nozzle 31 after initial setup to prevent tool damage, but a drain cock 32 at the elbow between the lower end of the supply hose 30 and the check valve 29 is used to drain the coolant system upon change of fluid. A discharge control cock may also be provided at the upper end of the supply hose near the discharge nozzle for regulation of coolant flow to the work. A vertical outlet opening may be located at any suitable location in the top surface 20 of the cabinet with suitable surface drainage grooves or areas pitched to the outlet. The outlet is here shown centrally located and opening through a vertical nipple and connected piping 34 to a flexible coolant return hose 35 clamped along the lower portion to the supply hose for return of fluid to the tray 24. The shelf 21 may be used for storage of a second reservoir tray 24a containing an additional supply of coolant for drilling operations or a different liquid such as a cutting oil for tapping.

To change the coolant or service the coolant system, the tray 24 on the lower shelf, and therewith the slidably mounted motor and pump unit 22—23 as permitted by the flexible hoses and motor electric conduit, may be withdrawn forwardly, and the tray lowered to the floor in front of the cabinet, whereupon it may be removed from beneath the pump and the connected coolant return and supply lines. The spacing of the lower shelf surface from the floor is of course of such height relative to the tray or reservoir height as to afford such removal clearance. With the return hose clamped to the supply as stated, it is impossible to restore the pump and reservoir to operating position without replacing the return hose, and the returned fluid may not be discharged through inadvertence except to the tray.

At opposite ends of the bed B, for mounting assemblies W and T, elevated parallel surfaces 36—37 have aligned longitudinal central T-slots 38 which may be formed at a single pass by milling or other suitable machining operation to ensure collinear adjustment motion of the two assemblies relative to each other. The bed may be of any suitable structure, such as a casting with a hollow recessed bottom and lateral apertures not only to permit coolant return flow thereunder to the central outlet as shown, but also to accommodate fixed portions of air line 39 and electrical conduit 40 running from the work head assembly W to the tool assembly T.

Tool assembly

The automatic tool T may be of any construction known to the prior art having the functional characteristics hereinafter described. In the tool assembly T as here shown a base 42 is secured on the horizontal bed surface 37 by a suitable key and clamping means in the slot 38 for slideable adjustment as hereinafter detailed for the work head assembly W. The rotating tool carrying spindle 43 is reciprocably and rotatably mounted in the base 42 for horizontal traverse toward and away from the work clamp vise V by a pneumatic cylinder enclosed in the housing 44; for example, as in one contemporary commercial drilling-tapping unit, the tool carrying spindle is rotatable in a non-rotatable quill extending coaxially through and slideably sealed to a double acting pneumatic cylinder unit and through the affixed piston therein, the end of the spindle being splined or otherwise reciprocably connected to a drive shaft, and rotationally driven by a belt and pulley or other suitable transmission means to the drive shaft. A drill chuck 46 is shown mounted on the spindle, but other axially fed tooling may be used, such as a drill or cap collet or automatic back out tapping unit. The electrical control and pneumatic actuating elements will be described in conjunction with the general control system.

Work head assembly housing and frame

Figure 3:
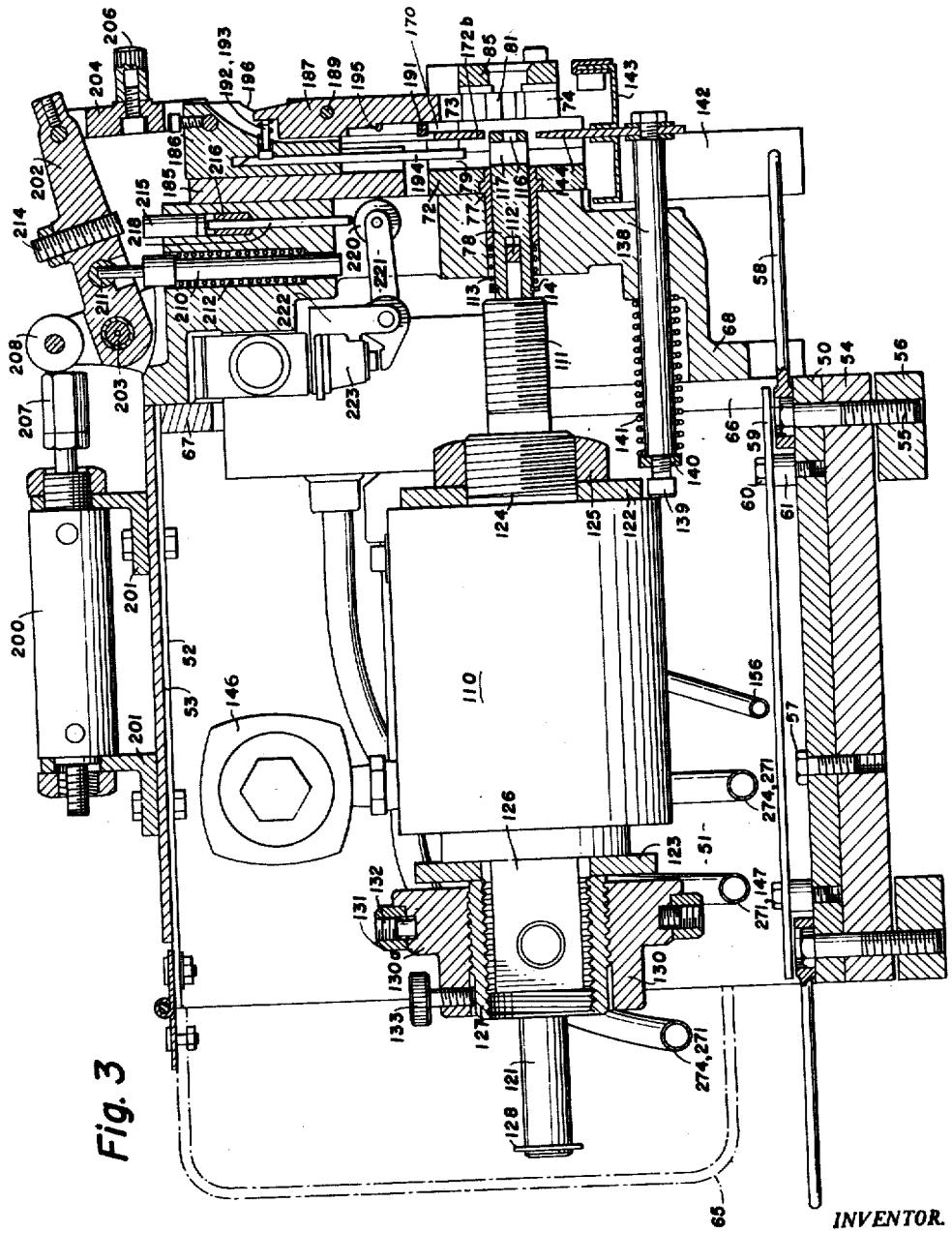
Fig. 3 is a substantially vertical axial section through the work head assembly of the machine taken substantially as indicated by the line 3—3 in Fig. 2.
Figure 4:
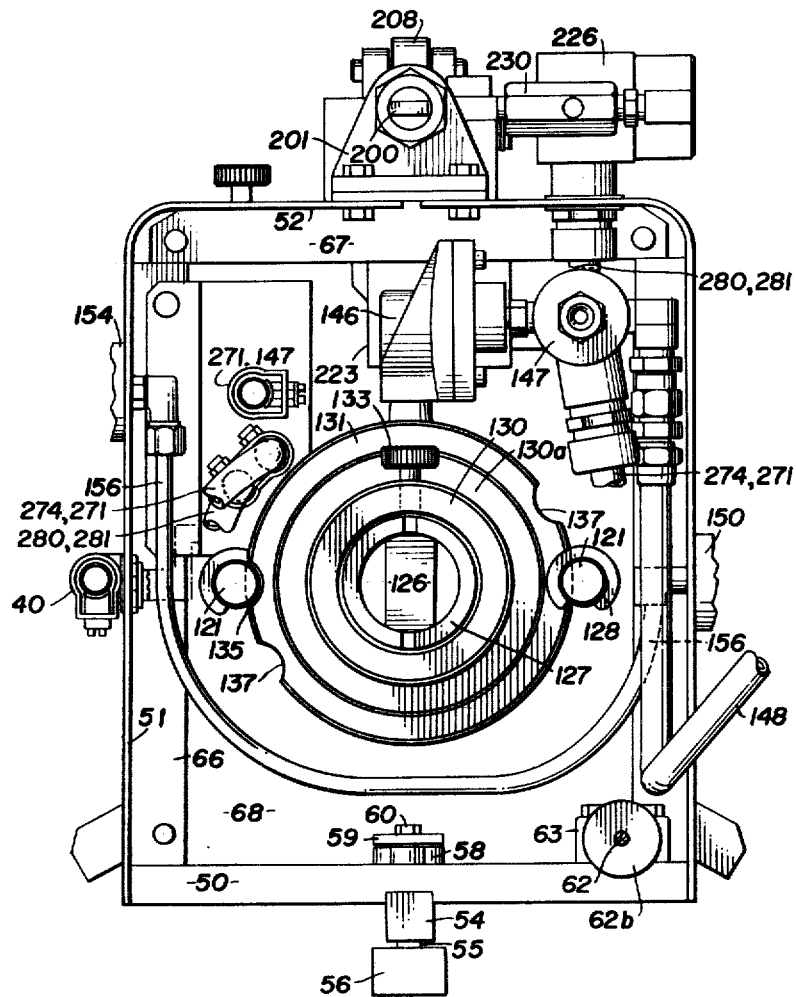
Fig. 4 is an end view of the work head assembly with an end cover removed and certain elements omitted for clarity, taken as indicated by the line 4—4 in Fig. 1.

The work head assembly W (Figs. 1, 3 and 4) has a housing open at opposite ends comprised of a base plate 50, parallel opposite side plates 51 welded to the base with top portions reflected or bent at right angles toward each other to terminate in spaced relation and form a top wall 52 with a longitudinal slot 53. In the bottom of the base plate 50, a central longitudinal keyway receives a key-bar 54 secured by central bolt 57 and projecting downwardly into and closely fitted to the vertical portion of the T-slot 38 at the elevated portion 36 of bed B. Clamping bolts 55 extend through the opposite ends of the base plate 50, key 54, and into threaded engagement with clamping blocks 56 disposed in the transverse portion of T-slot 38 to permit precision sliding adjustment of the assembly W. An adjusting screw 62 parallel to the slot 38 journalled in and having an end knob 62a normally bearing against a post fixed on the end of bed B and threaded into a block 63 fixed on the top of the base plate 50 provides fine adjustment of the assembly position relative to the bed. A nut 62b jammed against the block locks the screw position. Thus the unclamped assembly W may be moved away from tool assembly T until stopped by the post for tool changes or inspection, and returned to exact operating position, where the screw knob meets the post, for reclamping. A similar arrangement of clamping bolts and key and adjusting screw may be used between the base 42 of the tool assembly T and surface 37 of the bed. To facilitate adjustment of the work head assembly relative to the bed captive wrenches 58 are maintained on the heads of bolts 55 by a longitudinal retaining bar 59 secured in spaced relation to base plate 50 by cap screws 60 and spacer rings 61.

An end cover 65 is hinged to the top of the housing at the left side. Within the right end of the housing, vertical bars 66 and a top cross bar 67 are welded flush with the ends of the side wall portions 51 and top wall portions 52 of the housing respectively, to support a vertically disposed base member 68 mounting as a unit the hopper feeder H and the work blank vise V with the pneumatic actuating means therefor, and the escapement mechanism E. To permit in a certain degree position adjustment of the unit in a vertical plane transverse to the bed, the base 68 is supported on two horizontally symmetrically spaced dowel pins projecting from the cross bar 67 into oversize holes in the back of the base; and corresponding adjusting screws 70, passed through oversize holes at the corners of the base and threaded into the bars 66, 67 secure the base in adjusted position on the housing. (See Fig. 6.)

Work blank vise

In the work blank vise V extending horizontally across the lower part of the forward face of base member 68

Figure 7:
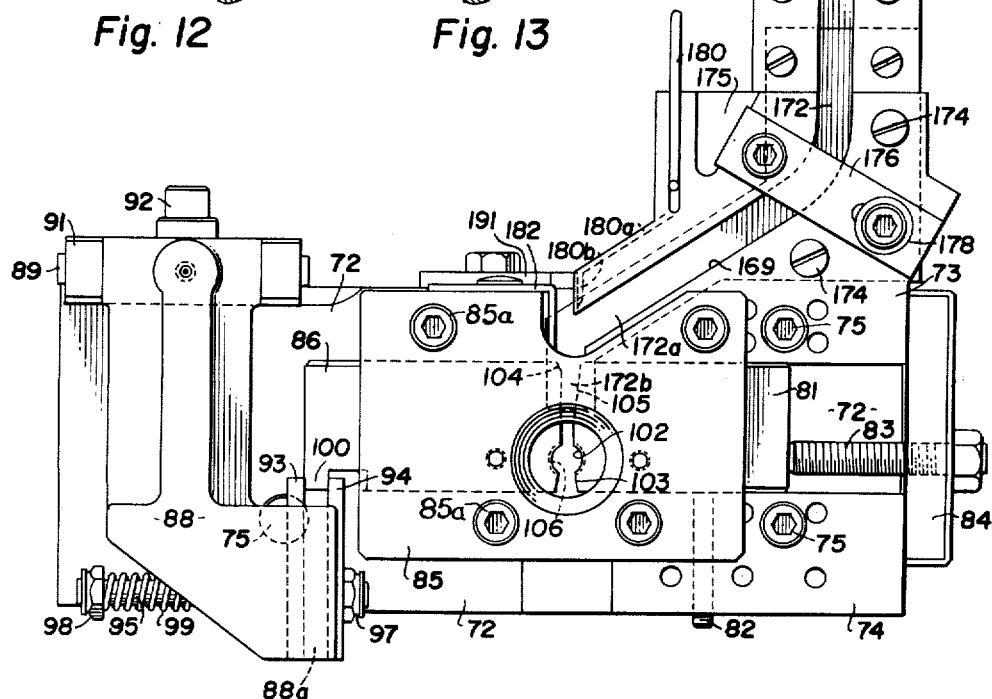
Fig. 7 is an enlarged detail of a portion of Fig. 2 showing the relation of a work blank track and work blank radial clamping means.
Figure 8:
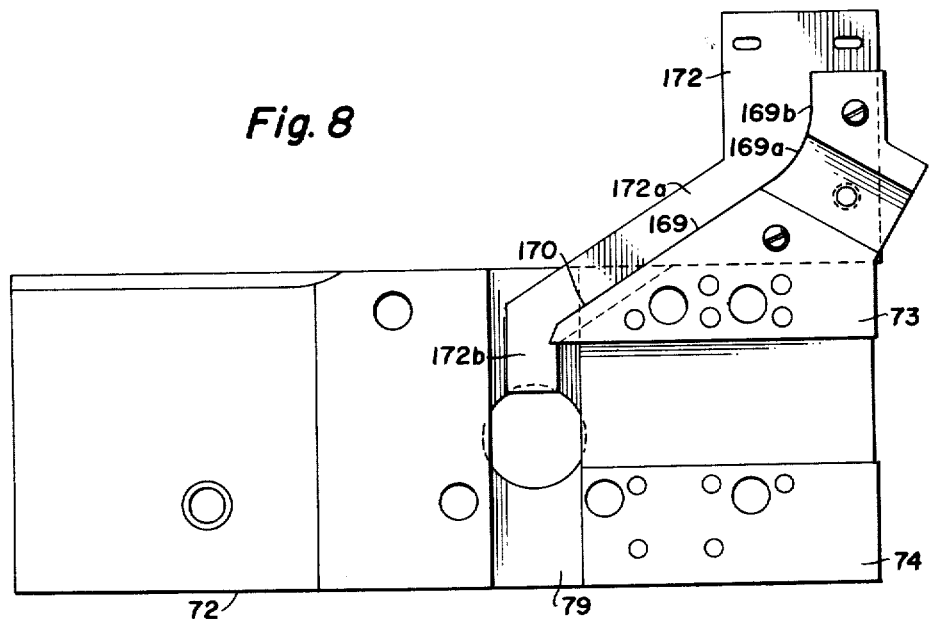
Fig. 8 shows the structure and relation of certain elements of the vise frame or radial work clamping body frame of the work head.

(Fig. 7), there is a vise frame sub-assembly, including a base block 72 with upper and lower spacer-guide blocks 73, 74 doweled on the right side thereof. The vise assembly is held on a forward vertical flat of base member 68 by three screws 75 extending through oversize holes in the sub-assembly for adjusting clearance and threaded into the base member 68, two of the screws on the right respectively passing through blocks 73, 74 as well as 72. A horizontal bore in base member 68, aligned with the spindle axis in tool assembly T, is provided with a bushing 77 for the reciprocable head 78 of an axial work blank head clamping mechanism. A head clamp aperture near the center of the block 72, aligned with the horizontal bore and counterbored to receive the forward end of the bushing 77 with retaining flange, is diametrically oversized relative to the bushing and its flange to allow some adjustment of the vise relative to base 68; but alternatively the bushing may have a tight fit in both base member 68 and block 72 to permanently align the apertures therein, while still allowing relative rotational adjustment. A wide vertical slot 79 centered on the axis of the head clamp aperture is cut into the outside face of the block 72 for passage of work blank heads and chips, and to accommodate certain other parts.

The more or less triangular upper block 73 and rectangular lower block 74 of equal thickness have opposed vertically spaced parallel faces between which a fixed radial blank clamping jaw 81 is adjustably mounted as in a slideway and held by a vertical set screw 82 in the lower block and by a jam nut locked back-up screw 83 in the back up plate 84 bolted across the outboard ends of blocks 73, 74. A tie plate 85 with right side over-lapping blocks 73, 74 to support the fixed jaw 81 against outward displacement, near center has a tool aperture generally aligned with the head clamp 78, and on the back face a vertical slot centered on the tool aperture for chip and blank end clearance. On the left of this vertical slot, the back face of the tie plate is raised to the thickness of the blocks 73, 74 and horizontally slotted to the same depth to form a slideway for a reciprocating radial clamp jaw 86 in general alignment with the first jaw and its slideway. The tie plate of course supports the movable jaw 86 as well as 81 against axial clamp thrust. Four cap screws 85a, symmetrically arranged on either side of the vertical slots, secure the tie plate to the vise base block 72.

On the left side of the vise base 72, a movable jaw centering bracket 88 to be swung up when necessary for removal and insertion of the jaw 86 or other purposes, is mounted on a pivot pin 89 through the projecting lugs 90 of a bottom-slotted hinge block 91 resting on relieved top portions of vise base block 72, providing a tongue and groove engagement permitting lateral adjustment of the bracket when the hinge block is correspondingly slotted for the clamping screw 92 threaded into the vise base block. A lateral extension 88a of the bracket includes a vertically disposed back projection running under the end of the movable jaw, and on opposite sides of this projection a pair of movable plates 93, 94 are supported by a rod 95 passed through the projection. A nut 97 is threaded on the inner end of the rod to bear on the plate 94, and a nut 98 on the outer end with interposed prestressed jaw biasing compression spring 99 bearing on the plate 98. A slot wider than plate 94 spaced from the end across the bottom face of the movable jaw forms a jaw projection 100 embraced by the top ends of the plates 93, 94, so that the movable jaw may be forced away from the opposed jaw against plate 93 compressing spring 99 as permitted by clearance between plate 94 and the jaw slot. On return of the jaw under spring force, the return motion of plate 93 is limited by the bracket projection, but the jaw projection 100 encounters the plate 94 to inhibit any casual further inward jaw motion interfering with blank injection when no work blank is engaged.

The radial clamping jaws 81, 86 are similar rectangular blocks formed from suitable tool steel, generally symmetrical relative to a vertical axial plane of a work blank engaged in axial alignment with the tool spindle except for the groove forming projection 100, or as otherwise noted. The clamping faces have toward the bottom opposed arcuate work blank shank clamping grooves or surfaces 102, each less than semi-cylindrical so that the jaws are spaced endwise when work is engaged; short straight parallel lips below the grooves leading to divergent equal exit bevels 103; and parallel upper faces longer than the lips, running from the grooves upward to blank inlet bevels 104 and 105 on movable and fixed jaw respectively of equal slope, which serve as camming surfaces when engaged by a work blank shank entering from above to force the movable jaw to the left. The movable jaw has an inlet bevel shorter and a straight portion to the groove longer than the corresponding areas of the fixed jaw. Where a work blank has a non-radial under-surface on the head, such as a flat or oval head rivet, the back face of each jaw has a head seat formation 106 of corresponding mating shape, e. g. a seat beveled or part of a conical surface for flat heads having a conical undersurface; otherwise the back of the jaw is flat.

The bevel 105 on the fixed jaw is the primary camming surface when a work blank shank is forced downward between the jaws, the short bevel 104 on the fixed jaw serving mainly as a lead-in surface upon initial entrance. The short lips leading to the outlet bevels 103 are ground back from the level of the straight inlet surfaces so that when a shank passes beyond upper camming bevel 105, the gap between the short lower lips is greater than the shank diameter, permitting free escape of a preceeding blank from the clamping seat. For work blanks of given head size the shape and location of the camming surfaces relative to the arcuate seats are so chosen, that the jaws are completely cammed apart to release the preceding blank before head interference can occur.

With most work blanks the axial head clamp force, applied as more fully explained, is sufficient to hold the work being cut; radial clamping force supplied by the pre-stressed compression spring 99, the force of which can be adjusted by nut 98, being effective primarily to center the work in the jaw seat previous to axial clamping. However, where needed additional radial force may be applied, through a rod 108 slideable in a transverse bore in bracket 88 and bearing endwise on the movable jaw, by the piston of a pneumatic cylinder 109 secured to the left end of the vise base block 72 or base member 68. Lost motion or clearance is provided between the piston and rod 108 to permit free camming of the movable jaw by an entering work piece. The valving control and air supply means for such radial clamping cylinder are then similar to that hereinafter described for the axial head clamp cylinder.

*Work head axial clamp mechanism*

The mechanism for axially clamping the head of a work blank includes the axial clamp head 78 in form a cylindrical member slideable in bushing 77 in base member 68, and an aligned pneumatic cylinder 110 located within the work head assembly housing, the spring-retracted piston 111 of which bears axially on clamp head 78, to bring the opposite forwardly projecting head end to bear axially on the top of a work blank head and clamp it against the head seat or back surfaces of the jaws. The back portion of head member 78 is slotted endwise to receive a transverse key 112. The opposite ends of the key are engaged in parallel keyways cut inward in the bore of member 68 for the bushing 77 from the back of member 78 to about the end of the bushing. A helical compression head spring 113 interposed externally on head member 78 between key 112 and an end snap ring 114 returns the head clamp member from clamping position. When the head clamp member 78 is retracted to a normal non-clamping position, key 112 does not bottom on the key slot of the clamp member, so that the latter is spring loaded into engagement with the retracted piston end.

Since the key keeps the head member 78 from rotating, both the top surface and under surface of a work blank head are engaged by non-rotatable elements to prevent work piece rotation, and it is unnecessary to use a pneumatic cylinder with non-rotatable piston or piston-to-head coupling to avoid scoring of work shanks or other untoward results.

Figure 9:
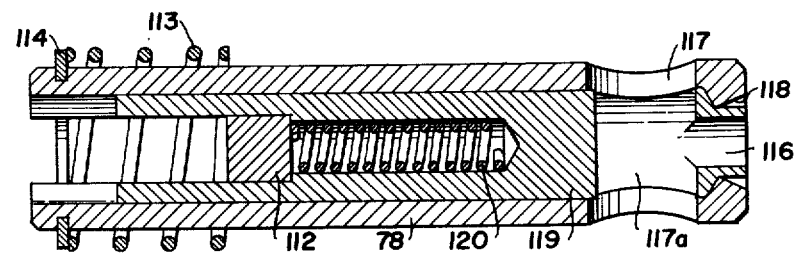
Fig. 9 is a detail of a modified form of an axial work piece head clamping device.

The clamping end of member 78 is axially bored inwardly at 116 to a diametrical opening 117 to provide run-through clearance for a tool working the blank, and for chip clearance as later described, the bore 116 being suitably beveled at 118 to afford wedging engagement with a blank head, particularly with the periphery of flat or oval heads. In Fig. 9, a modification of the axial clamp is shown, like numerals being used for parts analogous to those previously described, the member 78 here being tubular to contain a shorter reciprocable ejector element 119, also slotted to accommodate key 112 and having an axial bore for an ejector compression spring 120 bearing on the key 112. The ejector is diametrically bored at 117a and axially at 116 for tool run-through, and the head wedging bevel 118 is formed in the end aperture of member 78. The end of the ejector is reduced to form a retaining or stop shoulder, bearing on a mating surface inward of the conical or beveled opening of 78. When member 78 is advanced by its cylinder, the end of the ejector first bears on the blank head and so is displaced inwardly of member 78 which advances further to engage the head periphery. Thus upon release of clamping force, the spring return of member 119 relative to 78 ejects the work from any adhering relation to the wedging surface 118.

Figure 5:
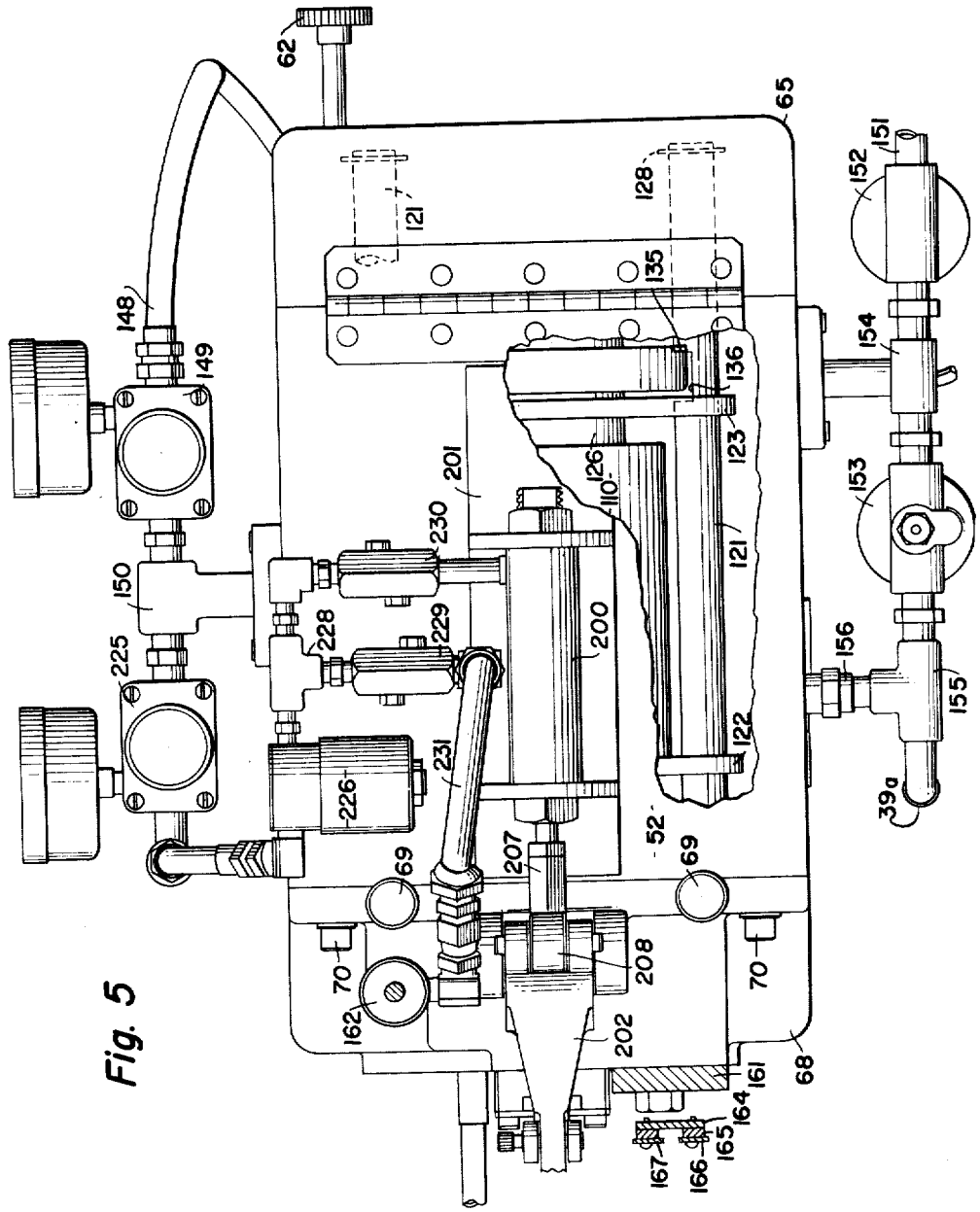
Fig. 5 is a top plan view of the work head assembly with some elements omitted or broken away to show more clearly certain internal structure.

For quick axial retraction in making adjustments or tooling changes, the axial clamp cylinder 110 (see Figs. 3, 4, 5) is slidably mounted centrally between parallel spaced horizontal guide rods 121 with forward ends secured in blind holes in the back face of base member 68, by centrally apertured front and rear yoke plates 122, 123 held respectively on the forward threaded cylinder stud 124 by a nut 125 and the rear threaded cylinder stud 126 by an internally and externally threaded sleeve 127, the laterally projecting portions of the yokes being apertured for sliding bearing on the guide rods. As end stops for the cylinder when unlocked and withdrawn for access to the back of base 68, there are on the ends of rods 121 snap-rings 128 to engage lock ring 131 on withdrawal of the cylinder unit.

An axial cylinder position adjusting ring 130, threaded onto the sleeve 127, has a circumferentially grooved and forwardly shouldered flange 130a mounting a rotatable locking ring 131 retained by screws 132 projecting into the flange groove; and an adjusting ring set screw 133 is threaded through the reduced end of the adjusting ring to bear on a reduced unthreaded end portion of the threaded sleeve and hold the latter two elements in threadably adjusted position. The back of the locking ring normally is engaged at diametrically opposed recessed radial areas 135 with the rearward radial walls of opposed slots 136 in the guide rods. Roughly semi-cylindrical notches 137 are diametrically disposed on a diameter about 30° from that of the areas 135, and rotation of the lock ring through a corresponding angle from normal locked position brings the notches into coincidence with the guide rods, permitting the cylinder to be drawn away from the work head base.

A rod 138, parallel to and vertically below head clamp member 78 and slidable in a bore through the base member 68, at its inner end is axially threaded to receive a screw 139 with head bearing endwise on the lower fore part of the cylinder 110. Between a jam nut 140 on screw 139 and the base member 68 a compression spring 141 is located on the rod 138 to bias the cylinder 110 rearwardly, so that in normal locked condition all lost motion is taken up between the flange shoulder and locking ring, and between the locking ring and back walls of the lock slots of the guide rods. By recessing the lock ring at areas 135, small shoulder areas are formed on the ring to prevent rotation to unlocked position during operation of the machine.

It may be noted here that the end of the rod 138 extending forwardly beyond member 68 carries a sub-assembly including an inner chute 142 beneath the vertical slot 79 in the vise base block 72 for leading chips down to a suitable receptable placed at the back of the machine; a forward blank discharge chute 143 beneath the opening between spacer block 74 and the tie block 85 to the front side of the machine; and a vertical partition 144 located just outward of the chip slot or bore 117 of the head clamp projecting into the slot 79 of the vise block to keep the chute assembly from rotating and the better to separate chips and work. The screw 139 serves to adjust the chute and partition position correctly, for any adjustment of axial position of clamp cylinder 110 or head clamp 78. Further the spring 141 prevents forward creep of cylinder 110 due to piston inertia on return from clamping position which would, because of consequent incomplete return of member 78, impede entrance of a work blank into the clamping vise.

To increase speed of operation of the machine and decrease the air consumption, the operating stroke of the axial clamp cylinder is kept short by rotating the ring 130 to bring the cylinder and piston unit forward until the clearance between head clamp 78 and a work piece head is about one thirty-second of an inch; and to shorten controlled air lines, a quick exhaust valve 146 exhausting directly to the atmosphere is mounted directly on the cylinder 110 with the solenoid controlled valve 147 connected directly thereto to control air admission from the flexible hose 148. Hose 148 carries air from the axial clamp pressure regulator and gage 149 connected by a nipple to and supported by a triple outlet bracket fixture 150 bolted to the front housing plate 52. Air taken from a plant main compressed air line through a flexible supply hose 151 is passed successively through air filter unit 152 and air lubricator unit 153, connected and supported by nipples and a bracket fixture 154 bolted to the back wall of the housing, to a T 155. One side of the T is connected by a flexible hose 39a and L's to a fixed tubular line 39 in bed B running to the tool assembly to supply air for the tool spindle traverse cylinder therein. Within the housing, a U-shaped tube 156 with one end L connected to the remaining side of T 155 and a second end L connected to the base inlet of bracket fixture 150 conducts air to the work head assembly. When the radial clamp cylinder is necessary, there is used a similar short line arrangement of quick exhaust valve and solenoid operated control valve directly on the spring-returned radial clamp cylinder, pressure regulator and gage supplied from a second outlet of the bracket fixture 150. Such regulators of course permit the use of minimum air pressures for respective cylinders and minimized air consumption.

*Blank feed and escapement*

The hopper feeder H, mounted above base member 68 on a stanchion plate 161 bolted to the front face of the base to discharge blanks downwardly in soldiered array to the escapement mechanism E with axes roughly horizontal and parallel to the tool spindle axis, here has an actuating shaft parallel to the tool spindle which is intermittently turned a part of a revolution for each blank passed through the machine, by a ratchet wheel and ratchet arm oscillated by an upright hopper pneumatic cylinder unit 162 of the spring retracting type. The piston is pivoted to the arm and a pivot pin 163 projecting from the forward face of and near the top of base member 68 pivotally secured the cylinder.

Figure 2:
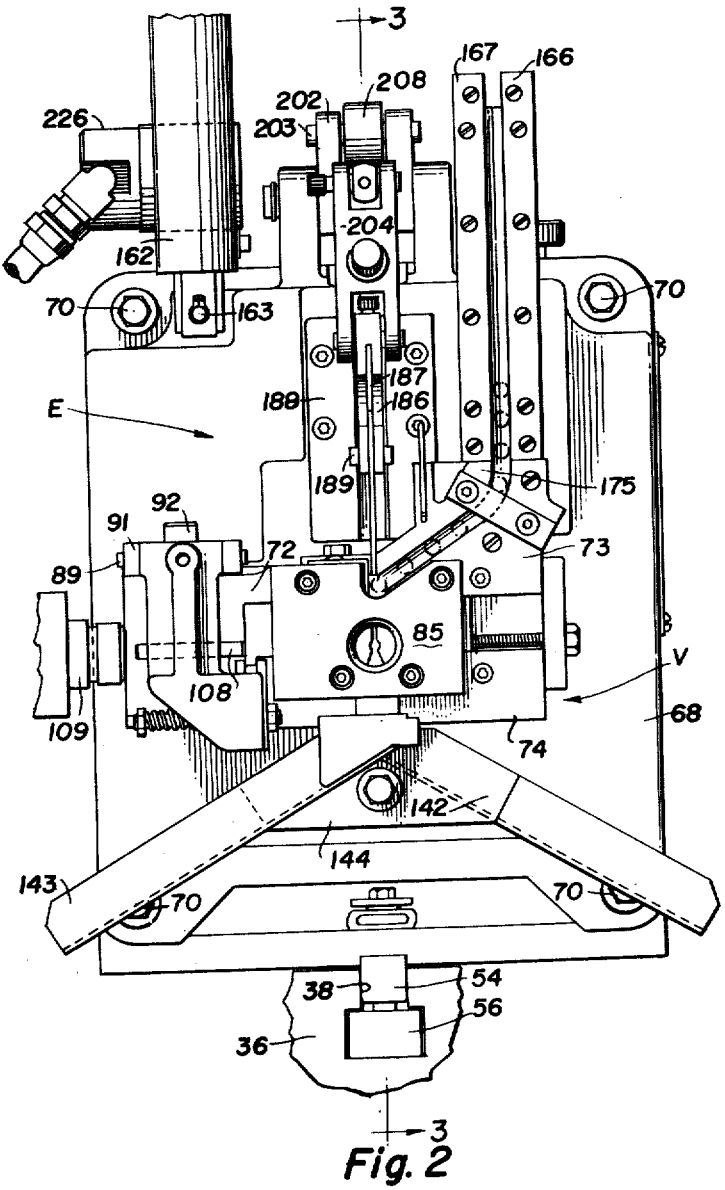
Fig. 2 is an inner end view taken as indicated by the line 2—2 in Fig. 1 of the work head assembly of the machine, certain portions being omitted.
Figure 6:
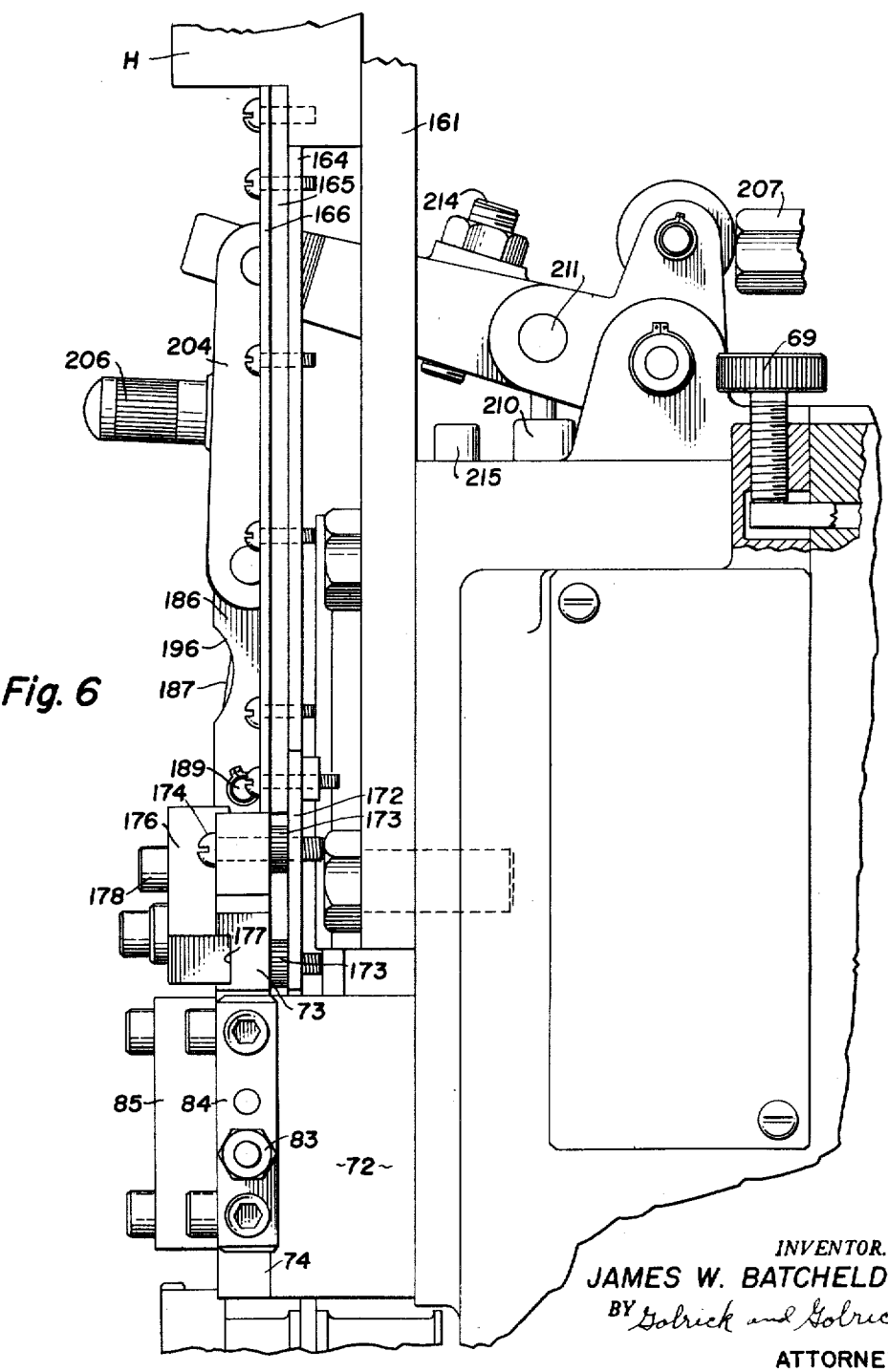
Fig. 6 is a fragmentary rear elevation of the work head of the machine.
Figure 12:
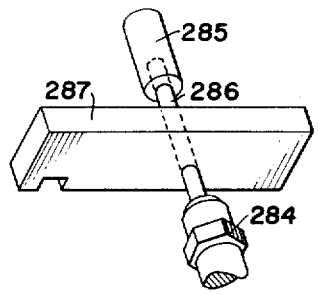
Fig. 12 is a schematic showing of means used to align axial clamping means with the tool axis.
Figure 13:
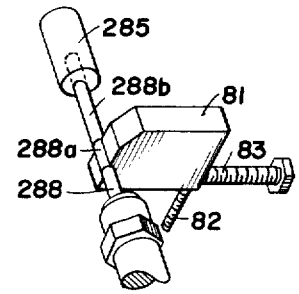
Fig. 13 is a similar view of means for locating the radial work clamping jaws relative to the tool axis.

As may be seen in Fig. 2 and Fig. 6 the hopper feeder discharges the blanks into a short vertical track secured to the hopper and vise sub-assembly V, whence the blanks waitflow by gravity along an oblique track along the top of the clamping vise V to a locus above the clamping axis. The vertical track comprises a back plate 164 with spacer bars 165 along each side and rails 166, 167 overhanging the opposed vertical faces of the bars to define a shank slot between the rails and a head space between back plate, spacers and rails. The rails with laterally extended screw slots are adjustably secured to the underlying bars and plate by several screws to vary the width of the shank slot. The spacer bars may be changed as needed for runs of work head with diverse head heights.

In the clamping vise, the top or triangular guide block 73 for the fixed jaw also serves as a part of the track, and therefore has an inclined top surface 169 running from a beveled point overhanging the vertical slot 79, through a curved portion 169a to a short vertical part 169b which forms a continuation of the much narrower shank slot face of rail 166. A small triangular area 170, to the right of slot 79 and extending beneath the inclined edge of block 73, is relieved along the top edge of the base block 72 to accommodate work blank heads. The top face of the tie block 85 is correspondingly recessed obliquely inwardly for inspection of the blank array to the very end of the track.

A head plate 172, spaced behind and secured to that part of block 73 extending upwardly above base block 72 by spacer washers 173 and screws 174 threaded into tapped holes of plate 172 forms a continuation of the upper track back plate 164, and has a laterally inclined and downwardly extending portion 172a, 172b running behind the inclined shank guide surface 169 of the block 73 to depend therebelow in the vertical slot 79 almost to the axial clamp 78. The bottom of the vertical track is anchored to the top edge of the head plate running under the lower ends of spacer bars 165.

An oblique adjustable top guide rail member 175, having a shank slot or guiding face generally complementary to the top guide surface of block 73, is secured in spaced relation to the head plate 172 for head clearance, and to the complementary track surface of block 73, by a bridge or element 176 secured by a bolt and slot connection in a slot 177 running obliquely across the face of block 73 in a direction roughly bisecting the included track angle. When the upper track spacings are varied by changing the bars 164 for head height differences in work piece runs, the head plate spacer washers 173 are changed; and so also with shank slot spacing changed between rails 166, 167, the upper member 175 of the inclined track section is varied relative to block 73 as permitted by the adjusting slot and bolt at 178.

A spring wire blank brake 180 bent in a vertical plane to form two legs hooked over and resiliently embracing the member 175 preferably with one leg in a locating slot, has an oblique arm 180a extending parallel to the lower track and a short vertically dependant point contact arm 180b near the end of the inclined track to engage a blank shank near the head when the brake is manually depressed into the blank path to restrain the blanks, say during machine inspection or adjustment. On the top surface of the tie block 85, a right angle blank stop 182 is secured by a screw through an adjusting slot in the top leg, a dependent leg of the stop being located in the vertical inlet opening opposite the end of the inclined track. This stop keeps more than one blank at a time from entering the space above the jaw inlet bevels, as well as positioning a blank above the jaw inlet bevels awaiting injection and preventing any blank from shelving on the top of the jaw 86.

A vertically slotted channel block 185, mounted on the upper part of the forward face of base 68, in alignment with the vertical slot 79 of the vise base block, provides a slideway for an escapement slide member 186. The forward face of the slide member is vertically slotted to carry an escapement blank pusher finger 187 for reciprocation in a vertical plane through the working axis of the machine and thereby engage the shank of a blank waiting at the end of the track above the jaw inlet bevels to inject it into the radial clamp jaws on a downward stroke. The slide member 186 is of T cross section and side plates 188 fixed on the channel block overhang the edges of the slide member so provided to retain the same in the slideway. The finger 187 is pivoted to the slide member at a point somewhat above center on a transverse pivot pin 189 near the bottom of the slide member. The lower end of the finger is biased inwardly with back edge bearing against a transverse latch bar 191 bolted to the top of the vise base block 72.

The finger biasing means is a detent spring 192 centered on a detent pin 193 to bear endwise against the head of the detent pin and the upper end of the finger. The head of the detent pin engages a notch spaced inwardly from the beveled upper end of a chip pusher rod 194 to retain the latter in a vertical hole drilled upwardly from the bottom of the slide member 186, for clearing chips from chip slot 117 in the axial clamp member 78 on a downward blank injecting stroke of the finger. The chip rod is simply removed by a half turn and downward pull.

The back edge of the pusher finger has in an upward direction a slight inward slant to a latch engaging shoulder 195, so that if no work blank is encountered on a downward stroke, the spacing effect of the blank head behind the end of the finger being lacking, the shoulder engages the latch bar to restrain completion of the stroke and interrupt the cyclic operation of the escapement mechanism and entire machine in the manner hereinafter described. Near the upper end of the finger however, the slide member is provided with a finger notch 196, so that the finger may be depressed against bias spring 192 to permit completion of a downward stroke for adjustment or inspection purposes. It may be noted here that on setup for a particular work blank, the pusher finger injection stroke is adjusted to stop short of impelling the blank shank into coincidence wtih the axis of the arcuate jaw seats so that the jaw closing automatically centers the blank.

Where the spacing of the track elements is increased to accommodate oval headed blanks, the heads of blanks in the track tend to ride up on one another, that is to overlap or "shingle." Such shingling may permit the shank of a following blank to swing over a blank already in waiting position, so that the second blank is also caught by the down stroke of the pusher, with possibility of an ensuing jam. To minimize such twisting a head plate is used with a short ramp located near the end of the oblique track leading onto a forwardly off-set terminal surface position of the plate, which begins at about the point indicated by reference numeral 172a in Fig. 7. When a blank head encounters the ramp, the blank is "de-shingled," straightened out in the track. For the short remaining path in the track the blank is maintained in proper orientation by the reduced head clearance at the head plate off-set.

The pusher slide of the escapement is actuated on downward stroke by a spring return type pneumatic cylinder unit 200 supported generally parallel to the machine work axis between two angle brackets 201 secured to the top of the assembly housing. The piston motion of unit 200 is imparted to the slide 186 by a motion multiplying bell crank 202, pivoting on a transverse shaft 203 through two spaced ears on top of the base member 68, and a link member 204 bifurcated at each end to receive the upper end of the slide and the outboard end of the bell crank, each secured thereto by pivot pins parallel to shaft 203. A grip knob 206 extends from the link for manual reciprocation of the slide in set up. A contact head 207 threaded on the end of the piston rod in unit 200 with associated check nut for adjustment of pusher finger position, bears on a roller 208 rotatable on a pin through the bifurcated short leg of the bell crank about an axis parallel to shaft 203, so that vertical adjustment of base member 68 does not require any change in the cylinder mounting and during adjustments manual reciprocation of the slide is possible without working against the cylinder unit 200. For return lift of the bell crank, hence of the pusher finger, a spring biased return rod 210 extending through a bell crank bottom slot is engaged in a radial opening of a transverse rocker shaft 211. The return rod is slideable in a central vertical hole through the top of base member 68, counterbored to accommodate a prestressed compression spring 212 between the bottom of the counterbore and an enlargement of the rod. Suitable sliding clearances are provided between rod, rocker shaft and base to keep the rod from binding by angular displacement.

Outward of the rod 210, a stop screw 214 with lock nut thereon is threaded through the bell crank to engage and depress a short dowel 215 movable in the upper end of a central vertical hole drilled from the top of member 68 and provided with a bottom bushing 216 which stops the downward motion of the dowel, hence of bell crank and pusher finger. Ultimately, therefore, the limit of the pusher finger stroke is determined by the setting of stop screw 214. A microswitch push rod 218 extends upwardly through bushing 216 to contact the bottom of dowel 215. The bottom of this rod extending downwardly through member 68 contacts a roller 220 carried on the longer end of a lever arm 221 extending into an opening through base member 68 from a bifurcated pivot bracket 222 on the normally open microswitch 223 supporting the lever with shorter arm below the microswitch button. The microswitch 223, bolted in a back recess of member 68 is actuated when dowel 215 is a fraction of an inch short of abutting relation with bushing 216, to initiate action of the tool assembly T as later explained. The previously described finger latch mechanism prevents a stroke of such degree as actuates the microswitch when no blanks are available and so interrupts operation. Vertical adjustment of the finger slide over considerable range need not affect the microswitch adjustment, and adjustment of the base member 68 on the housing cannot.

The air supply to the hopper actuating cylinder 162 and escapement or pusher finger actuating cylinder 200 is regulated in pressure by pressure regulator and gage 225 connected and mounted to triple outlet fixture bracket 150 similarly to regulator 149, and in off-on control by a solenoid operated air valve 226 on the outlet side of regulator 225. The controlled outlet of valve 226 opens through the side outlet of T 228 through a needle type flow control valve 229, and on the run of the T through an L and second like flow control valve 230, respectively to a flexible hose 231 to the hopper cylinder 162 and directly to the escapement cylinder 200. These flow control valves permit unrestricted back air flow control on piston return and are adjustable for forward air flow control and hence of the operating speed of these units.

*Electric and pneumatic control and actuating systems*

Figure 10:
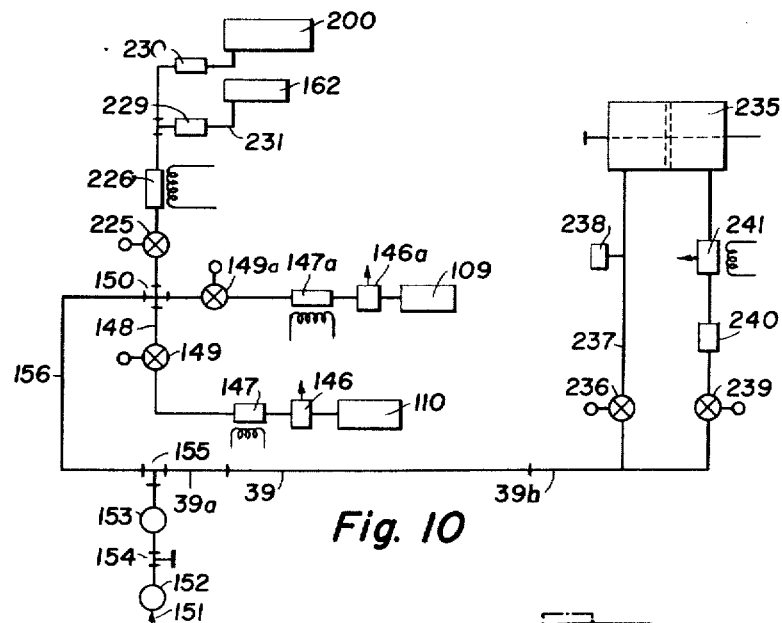
Fig. 10 is a schematic diagram of the pneumatic actuating system for certain work head assembly and tool operations.

The pneumatic actuating means for the several units of the work head assembly previously described for each of the functional mechanical groups are shown in relation to each other and to the correlated actuating means of the tool head assembly in the schematic diagram of Fig. 10. The solenoidally opened valves for the radial clamp cylinder 109 and the pressure regulator therefor are indicated by 147a and 149a to correspond with the like elements for the axial clamp cylinder. The tool assembly T, described briefly in function, per se in general organization is old and no part of the present invention, though the manner of integrating its pneumatic operation and electric control with the work head is part of an inventive combination.

A tool, such as a drill or tap carried by a chuck or an automatically reversing back-out tapping head on the tool spindle, is advanced axially to a work blank held in vise V, by air pressure applied in a pneumatic spindle traverse cylinder 235 which is to be quickly retracted upon completion of the work. A well known automatic drilling unit suitable here includes a spindle traverse pneumatic cylinder with spindle rotatable in a reciprocable quill extending as a piston rod through opposite end walls of the cylinder, wherein the spindle is advanced to work engagement by high pressure air applied at one end of such a cylinder unit 235 in opposition to low pressure air constantly applied to the other end of the unit which latter retracts the spindle when the high pressure side is vented. The air is taken from a supply line as 39b, through a low pressure regulator 236 with gage and line 237 including a poppet valve 238 or the like to vent the low pressure side to atmosphere when the high pressure moves the piston of unit 235 against the low pressure. For the high pressure side, air is taken from 39b successively through a high pressure regulator 239 with gage; a traverse advancing flow control valve 240; and a solenoidally operated three-way air valve 241 supplying air through a short line when energized to the unit 235 and exhausting the same to atmosphere when the solenoid is deenergized.

In the disclosed machine the air supply line is simply connected by a flexible hose 39b to the tubular portion of the air line 39 in the fixed bed to 39a of the work head assembly. When the three way valve 241 is opened for tool advance, air to the high pressure side of 235 in advancing the piston expels low pressure air through poppet 238; and the tool is maintained at advanced position, or force is continually applied for cutting advance; and on closing of the three way valve, immediately venting the high pressure side of unit 235 at atmosphere, the constantly applied low pressure air immediately starts the tool and spindle on withdrawing traverse.

In the wiring diagram, a magnetic type starter box A having magnetically closed and held contactors CS, three for the three phase tool assembly driving motor 45 and the three phase coolant motor 22 and one a holding circuit contactor, includes a master switch MS for incoming three phase 220 volt power, and has associated therewith a normally used start-stop switch S controlling power to the entire machine. The contactor coil for contactors CS is in a branch including in series two heater switches, the heaters of which are in two of the controlled three phase load lines. The coolant motor is also dependently controlled through an intermediate fuse and switch box D. A step-down transformer F with primary across two of the three-phase lines provides 110 volt power to a cycle timer unit G and to a control circuit box J of the tool assembly as hereinafter described. The aforementioned components A, S, F, and G may be conventional and located on or in the cabinet C. From the diagram it appears that normally the coolant and tool motors are running continuously after the start button is pressed at starter switch S.

Figure 11:
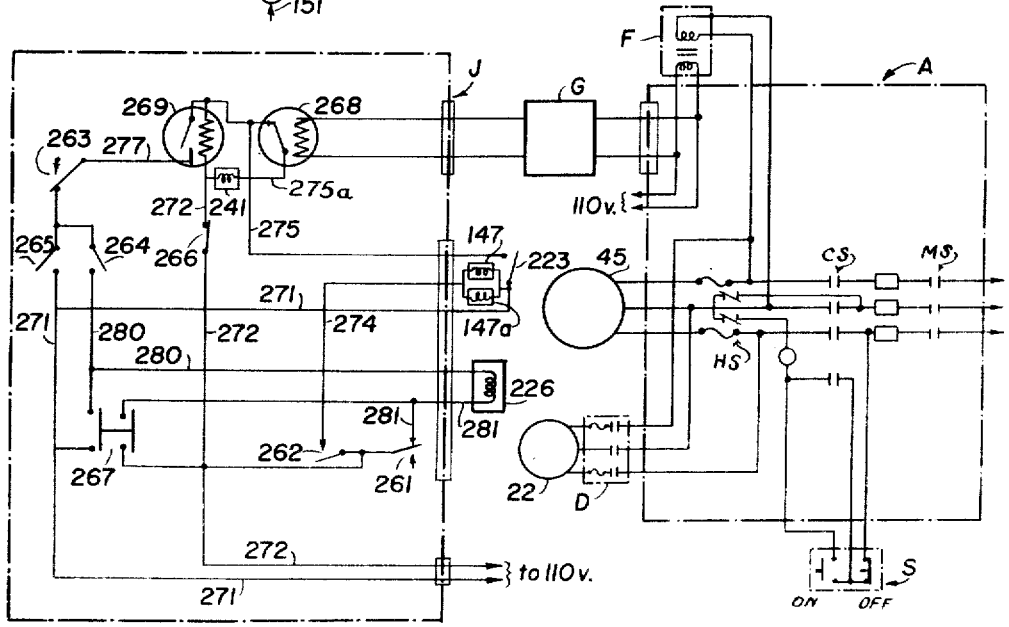
Fig. 11 is a schematic wiring diagram of the electrical control system integrating the pneumatic actuating and electric driving systems for automatic operation of the entire machine.

The drilling and tapping tool assembly, as indicated by the enclosing dashed outline J of Fig. 11, also includes retracted limit switch 261, a second retracted limit switch 262, a forward traverse limit switch 263, all operated by tool spindle traverse motion and all of which may be microswitches: an on-off single pole switch 264 for turning the control box and system J off and on; a single pole selector switch 265, set to an "on" position for automatic operation of the entire machine, and to "off" for manual operation; a manual safety retract switch 266, normally closed, and provided only as a safety device for quick retraction of the tool; a manually operated trip control double switch 267; a normally closed relay 268 with coil connected to the timer output, opened only upon energization of its coil by the output of cycle timer G—when the latter is used, for example in certain drilling operation to oscillate the drill, by interrupting and restoring current to the traverse control three-way valve 241, while the rest of the control circuit remains energized; and a normally open relay unit 269. These several elements are shown for full tool retraction with 264, 265 off. Suitable cables and plug receptacles on the tool assembly housing are provided for connection with the output of the cycle timer, with the 110 volt secondary of the transformer F, and with the microswitch 223, work clamping solenoid valves 147, 147a and hopper and escapement solenoid valve 226 of the work head assembly. Thus the conduit 40 from the assembly T to a terminal block within the work head W may enclose lines 271, 274, 275, 280, 281, whence flexible conduits may be used to distribute the lines to the elements of the work head.

The switch 263 is normally closed, and is opened at a desired end point of forward tool stroke traverse by a suitable linkage to the tool spindle, for example by a stroke adjusting screw contacting a lever arm type linkage which bears on the microswitch button. The switches 261, 262 may be mounted one on the other, for actuation by a linkage system having a single lever arm in constant contact or connection with the tool spindle and having a second arm rotatable with the first carrying adjusting screws bearing on the microswitch buttons where the switches are both normally closed or open, or where one is a normally closed and the other a normally open type switch, with one screw contacting a first class lever arm mounted on one of these switches to bear on its button. In any event the arrangement is such that switch 261 is closed and 262 open at full tool retraction, with 261 opening shortly after forward tool traverse has begun and 262 closing after 261 opens, say with a lag equivalent to 1/16 inch of the tool advance, while the switch operating sequence is reversed as the tool retraction stroke nears completion.

The line 271 of the 110 volt supply to the tool control unit J within the unit is connected to one side of the selector switch 265, and carried out to the work head assembly for a connection with one side of the microswitch 223 and of the parallel solenoid coils of axial and radial clamping cylinders 147, 147a. The other 110 volt line 272 is connected to one side of microswitch 262; to the movable contact arm of microswitch 261; through safety switch 266 (hereinafter considered closed and part of line 272, since having no part in normal operation) to one side of the solenoid of the three-way traverse control valve 241; and to one side of the relay coil in 269.

The other side of the parallel solenoid pair 147, 147a is joined by line 274 to the second side of switch 262; and hence closing the latter energizes the axial and radial clamp valve solenoids 147, 147a for work clamping, and opening thereof releases the pneumatic clamping forces on the work. The remaining side of the escapement microswitch 223 is joined directly by line 275 to the second side of the relay coil in 269, to one side of the relay switch in 269, and to one side of the switch in relay 268, the other side of the latter switch being connected by 275a to the second side of the solenoid coil in 241. Therefore where the cycle timer is not used to open and close normally closed relay 268, the microswitch 223 is in effect directly connected to the solenoid at 241, and closure of switch 223 will not only energize and close relay 269 as will always occur independently of 268, but also will energize solenoid 241 for forward tool traverse. However, the second side of the switch in normally open relay 269 is connected by 277 to one side of normally closed forward traverse limit switch 263, the opposite side of which is connected by 278 to the remaining side of selector 265 and one side of switch 264. Accordingly forward traverse once initiated by escapement switch 223 will continue first, as long as the latter is held closed; or secondly, with selector 265 closed, so that relay 269 becomes self-holding and closed to supply a branch parallel to microswitch 223, until forward traverse limit switch 263 is opened at the end of forward tool stroke to open and de-energize both relay 269 and traverse solenoid valve 241 to cause a tool retraction.

The escapement and hopper valve solenoid 226 at opposite sides is connected by lines 280 and 281 to the remaining side of switch 264 and to the fixed contact of microswitch 261 which is contacted by the switch arm when the tool is fully retracted. The double switch 267 has one half connected between lines 271 and 280 and the other half between lines 272 and 281, in other words to a supply current to solenoidal valve 226 for hopper and escapement mechanism independently of other switches in unit J.

*Operation*

It is assumed that the escapement mechanism oblique and vertical tracks are filled with work blanks; and therefore with the escapement finger retracted, a blank is in position against the blank stop 182 blocking escape of a following blank, and waiting atop the jaw inlet bevels for injection so that the finger latch will not engage; further that the cycle timer is not used, but the master switch at A and starter switch S are on so that the motor 45 is running and the coolant pump and motor 22, 23 are delivering liquid to the work head.

With 265 closed for automatic operation, upon turning on switch 264 the solenoid valve 226 is energized and opened to supply air to and extend the hopper actuating cylinder unit and escapement cylinder unit, since the tool is fully retracted and 261 closed. Therefore the hopper ratchet mechanism turns the hopper shaft on its extending stroke, and the escapement slide with injector finger moves down to close switch 223 and to push a waiting blank between the radial jaws, camming them apart for release of a preceding blank and reception of the injected blank in the arcuate seat. As long as finger 187 is in downward position, the end of the track is closed to hold back blanks. Closing the switch 223 energizes solenoid 241 to initiate forward tool traverse, and energizes relay 269 which is then self-holding.

Shortly after traverse starts, the tool motion opens switch 261, deenergizing the solenoid valve 226 to cut off air supply to and exhaust air from the hopper and escapement cylinder units which are contracted by their springs. This permits the escapement slide to rise taking the escapement finger out from the jaws to open the track end for escape of a single work piece into waiting position on the top of the jaw inlet bevels during forward spindle traverse, and also the switch 223 to open. With a slight further advance of the tool spindle, switch 262 closes, energizing both clamp solenoid valves for radial and axial clamping before the cutting tool on the spindle encounters the work. When the pre-chosen stroke is reached, forward limit switch 263 opens to de-energize and open the relay 269 and solenoid valve 241, exhausting the high pressure side of the traverse cylinder for the retraction stroke, toward the end of which first switch 262 is opened to deenergize and open axial and radial clamp solenoid valves 147, 147a for exhausting the corresponding clamping cylinders 110, 109 removing all force except radial spring force clamping the work. Thus the blank is clamped through a portion of the time when tool retraction is occurring as would be necessary where automatic tapping is being carried on by the machine, and the work must be held until the tap is backed out. Then as the tool spindle completes its return stroke, it closes the switch 261 to initiate the cycle again by energizing the escapement and hopper solenoid valve 226 for a continuing repetition of the cycle in like manner automatically. If a work blank were not, as above assumed, present at the end of the track above the jaw inlet bevels, the finger stroke would not be stopped by the latch mechanism.

By repeatedly opening and closing the switch 267 (with 264 and 265 open) a newly filled feed hopper can be rotated to bring blanks down into the track. With blanks in the track, 267 may be closed to inject and clamp a blank, advance a tool into it and drill without retraction as long as 267 is kept closed to keep 226 energized and the escapement slide down, and therefore 223 closed to keep 241 open applying forward traverse air pressure in tool assembly T.

The cycle timer may be used to open and close relay 268 during the cutting period of a relatively deep drilling operation or where the blank material being drilled is non-homogeneous, thereby oscillating the drill during cutting to clear chips and permit better access of coolant or cutting liquid, without carrying the tool into reverse traverse until the drilling has been completed.

*Aligning procedure*

It is assumed that by proper erection the spindle axis and axial clamp axis are parallel to the bed slot 38. With the axial clamping cylinder unlocked and withdrawn for access to the head clamp device, the clamp head member 78 assembly is removed from the back of the base 68 and a bushing 285 having an axial end bore and external diameter equal to member 78 substituted for the latter. A drill chuck or collet 284 is mounted on the end of the tool spindle and therein is chucked an aligning pin 286 closely slip fitting the end bore of the aligning bushing. With corner bolts 70 loosened the entire unit sub-assembly of base 68 is shifted in a vertical plane transverse to the work axis with aid of screws 69 on the aforementioned supporting dowels until the bushing can receive the aligning pin. The base 68 is then secured by and clamped to the housing. By this means the head clamp when replaced will line up with the proper work piece position coaxial with the tool spindle.

Next the aligning pin is withdrawn by backing off the tool assembly. There is slid (from the left of Fig. 2) into the vise frame jaw slideways an aligning bar 287 which has the height and overall length of jaws when in blank clamping relation, a horizontal hole of diameter suited for close slip fit with the aligning pin 286, and a left end notch forming a projection like 100 of the left jaw. The vise frame sub-assembly is then shifted up or down on base 68 to permit insertion of the chucked aligning pin through the aligning bar hole and into the bushing. The position of bracket 88 and stress of spring 95 may then be adjusted if needed, the notched aligning bar serving as a gauge for this purpose also. Thereafter the vise frame sub-assembly is clamped in place by screws 75, the pin withdrawn, and the aligning bar removed.

Where the bushing 77 is closely fitted in both base member 68 and block 72, the initial alignment of both with respect to the tool axis is effected simultaneously by adjustment of base 68 in the vertical plane.

The foregoing steps generally speaking are required only upon initial setup of the machine; thereafter any further aligning operation, to lock the jaws on initial setup or upon change of jaws for different work pieces, requires only the following steps. A second jaw aligning pin 288 is chucked, having an intermediate portion 288a of a diameter the size of the work piece shank for which the jaws are designed and an end portion 288b fitting the axial bore of the aligning bushing. The chucked aligning pin is advanced into the bore of the aligning bushing, and the right (stationary) jaw is slid in its seat or slideway against the enlargement and then locked by tightening such screw 82 and back up screw 83. Thereafter the movable jaw (left) is inserted at the left side of the vise assembly and the centering bracket is dropped back into position. Where the heights of the arcuate seats of the fixed jaw and movable jaw happen to be slightly different, the tie plate may be adjusted with screws 85a loosened until the movable jaw arcuate seat properly fits the enlargement of the aligning pin and the tie plate is then clamped.

Machines with the aforegoing structure and controls have been found quite successful in accurately and securely holding headed blanks such as rivets for accurate axial tapping or drilling without collapse of thin walls. The set-up and alignment of the machine components especially in changing jaws for change-over of blank sizes, is quickly accomplished and easily checked during the course of long runs. With the tool elements of the tool assembly easily accessible in the machine and the tool assembly limit switches adjustable, tooling and control changes necessary for other operations on the blanks—such as hollow milling, centering, step drilling, countersinking, spot facing and reaming—are readily effected.

As examples of standard performance in a commercial form of the machine may be noted a blank transfer time of about one-third second on the injection stroke; a rate of sixty pieces per minute for drilling $9/_{32}$ inch with a #30 drill, a rate of seventy per minute for drilling $5/_{32}$ inch with a #17 drill, and one hundred and five pieces per minute tapped $3/_{16}$ inch with an #8–32 tap; and also, operating on an air line pressure somewhat above fifty pounds per square inch, a total compressed air consumption for all the pneumatic motor or cylinder units of about a cubic foot of free air per five hundred blanks.

For blanks of certain proportions, long with respect to the head, inclined head suspension type tracks may be preferable, in which case a cone frustrum side-grooved to form a shank seat, may be rotatably mounted as a transfer wheel rotated by an indexing mechanism to receive a blank from the track outlet and transfer it to an indexed position opposite the movable jaw, a surrounding shield being used to keep the blank in a groove during transfer. At a position opposite the movable jaw member, the blank is clamped by the movable jaw against the wheel as a fixed radial clamping element and by the axial head clamp element against the radial clamping members.

I claim:

1. A machine for automatically performing on a succession of headed work blanks an operation with a tool fed substantially axially toward the unheaded end or shank of each blank, comprising: radial work blank clamping means including a pair of clamping jaws relatively movable toward and away from each other, said jaws having opposed end faces thereof mutually adapted to provide cooperating surfaces as a seat formation for clamping a blank radially below the head and for supporting the underside of a work blank head against an axial clamping force; axial work blank and head clamping means movable at right angles relative to said jaws to clamp a blank head axially against said jaws, and head clamp motor means; work blank feeding and escapement means including feed track means for receiving and holding a series of blanks in soldiered array and presenting at the track discharge end successive blanks to said jaws with heads disposed toward the axial clamping means, a slide element reciprocable across the discharge end of the feed track means and perpendicularly across the paths of motion of the axial clamping means and of the jaws for injecting a blank upon an injection stroke into the seat formation between said jaws and thereby release a preceding blank, and slide actuating motor means; a tool driving and feeding mechanism including motor means adapted to reciprocate the tool in an advance stroke feeding the tool substantially axially toward the free end of a blank held in said clamping means and thereafter in a retraction stroke; and electrical control circuit means controlling said motor means in correlated cyclicly repeated operations of axially clamping a work blank and of advancing the tool relative to a work blank upon completed injection of a blank for a work operation on the blank, retraction of the tool upon completion of tool work operation advance, and release of the head clamping means and thereafter injection of a succeeding work blank into said jaws during retraction of said tool.

2. A machine for performing an axial drilling, tapping or like work operation on the shanks of successive headed work blanks such as rivets, comprising a bed, a work head assembly on the bed for feeding work blanks successively into and clamping them at a work station provided therein, and a tool assembly including tool mounting means to mount a tool for performing the work operation and reciprocating means for advancing and retracting the tool relative to the work station along an axis collinear with the axis of a blank clamped at the work station; said work head assembly including a fixed member secured to the bed, a base member adjustably mounted on the fixed member for adjustment in a plane transverse to the axis of tool advance, a vise frame adjustably mounted on the base member for adjustment in a plane parallel to the first named plane, said frame having a slideway parallel to said planes, a pair of opposed radial blank clamping jaws defining therebetween said work station and adapted to clamp a blank shank perpendicular to said planes and to support the underside of a blank head against axial thrust, one of said jaws being adjustably secured in and the other movable in said slideway toward and away from the one jaw, means biasing the movable jaw toward the secured jaw for applying a radial clamping force upon a blank shank, axial blank clamping means including a head clamp member reciprocable in the base member perpendicularly to said planes for clamping a blank head against the jaws, and blank feeding and escapement means for injecting single blanks successively between said jaws.

3. In combination with a machine of the character described in claim 2, aligning means comprising a coaxially bored bushing inserted in place of said head clamp member, a pin supported at one end in said tool mounting means and having the other end adapted for insertion with close slip fit in the bore of said bushing, whereby the locus of the head clamp member in said base member may be aligned with the axis of tool reciprocation.

4. In combination with a machine of the character described in claim 2, aligning and adjusting gage means comprising an aligning block having the size of said opposed jaws when in clamping relation for a given blank, and a bore therethrough corresponding to the location of a blank to be clamped in said jaws, and an aligning pin supported at one end in said tool mounting means and having a portion of the pin length adapted for insertion with close slip fit in the bore of said aligning block whereby the vise frame and any components related to said jaws may be adjusted to correspond with the location of said jaws with the defined work station aligned with the axis of tool reciprocation.

5. A machine as described in claim 2 wherein said means biasing said one jaw into clamping relation comprises a bracket pivoted to the vise frame on an axis parallel to said slideway, a jaw engaging lug carried by said bracket and a cooperating formation on said one jaw, and a compression spring mounted on said bracket to react thereon and bias said lug and jaw in a clamping direction.

6. A machine as described in claim 2 having fluid cylinder means mounted on said base member with a horizontally acting element aligned with said one jaw to apply clamping force thereto.

7. A machine as described in claim 2 having control means correlating and integrating the operation of said blank feeding and escapement means, axial clamping means and reciprocating means for sequential injection of a blank between said jaws, axial clamping of the blank head, tool feed advance of the reciprocating means, retraction of the tool and release of the axial clamping means in an automatically repeated cycle of operations; said control means including switch means operated by the blank escapement means in introducing a blank between said jaws to initiate tool advance of the reciprocating means, first, second and third limit switches associated with and operated by the reciprocating means, said first limit switch operated at a predetermined end point of a tool feed advance for initiating tool retraction by the reciprocating means, said second limit switch operated at a point near the end of tool retraction to initiate operation of the blank feeding and escapement means for injection of a blank between the jaws, said third limit switch being operated in one sense after initiation of tool advance for clamping actuation of the head clamping means and in a reverse sense near the end of tool retraction and prior to operation of said second limit switch to release the head clamping means.

8. A machine as described in claim 7 having cooperating latching means on said base member and said blank feeding and escapement means adapted to be held in nonlatching relation by a blank being introduced between said jaws and to prevent operation of the said switch means by the blank feeding and escapement means with a blank absent, whereby automatic repetition of said cycle of operations is stopped upon lack of blanks.

9. A machine as described in claim 2 wherein said blank feeding and escapement means comprises a track for receiving and holding blanks in soldiered array and discharging adjacent said jaws, a slide element reciprocable between said jaws and parallel to said planes to introduce a blank between said jaws, and stop means to position a blank discharged from said track in the path of the slide element and blocking a succeeding blank from discharge; said jaws having on opposed faces cooperating blank shank seat formations and camming surfaces leading thereto whereby the jaws are separated during introduction of a blank to release a preceding clamped blank; and wherein pneumatic cylinder units are provided as motor means actuating said head clamp means and said blank feeding and escapement means.

10. In a machine performing on headed work blanks a work operation by a tool fed toward the unheaded end portion of each successive blank clamped at a work station, a work head assembly comprising: base means; radial work clamping vise means supported by the base means including a pair of opposed radial clamping jaws, a vise frame adjustably mounted on one side of said base means for adjustment parallel to a vertical plane and having a slideway formation disposed generally horizontally and parallel to said plane in which at least one of said jaws is movable toward and away from the other jaw, and means biasing said one jaw toward the other into radial blank clamping relation, said jaws having opposed end faces thereof mutually formed to define a work station and adapted to clamp cooperatively therein a work blank radially below the head with axis disposed perpendicular to said plane and with the underside of the head supported against axial thrust, said jaws also having camming surface portions convergent toward said work station engageable by a work blank injected between said jaws into the work station, for separating the jaws to admit the blank and release a previously clamped blank; axial head clamping means including a head clamp element reciprocable in the base means perpendicular to said plane adapted to engage axially a blank head and clamp it against said jaws, and means biasing the clamp element away from said jaws; and blank feeding and escapement means including a slide structure carrying a blank engaging portion and vertically reciprocably mounted on said one side of the base means to move from a locus spaced from said jaws inwardly between the camming portions of the jaws in a blank injection stroke, feed track means having an outlet discharging between said locus and said jaws, the track means being adapted to receive and hold a series of blanks in soldiered array and discharge each blank with head disposed toward the head clamp, and stop means cooperating with the track means to position a discharged blank in the path of the slide adjacent the camming portions of the jaws and blocking discharge of a succeeding blank; and motor means for sequentially actuating the slide structure and the head clamping means.

11. A work head assembly as described in claim 10 wherein said means biasing said one jaw into clamping relation comprises a bracket pivoted to the vise frame on an axis parallel to said slideway, a jaw engaging lug carried by said bracket and a cooperating formation on said one jaw, and a compression spring mounted on said bracket to react thereon and bias said lug and jaw in a clamping direction.

12. A work head assembly as described in claim 10 having fluid cylinder means mounted on said base member with a horizontally acting element aligned with said one jaw to apply clamping force thereto.

13. A work head assembly as described in claim 10 including a switch operated by said slide structure on a blank injection stroke as a control element for initiating operation of a tool assembly with which the work head may be used for performing said work operation on a blank clamped in the work head assembly.

14. A work head assembly as described in claim 13 including cooperating latch means on said vise frame and slide structure adapted to be held in unlatched relation by a blank being injected into said jaws and to engage in latched relation when a blank is absent thereby to prevent completion of an injection stroke and actuation of said switch.

15. In a machine performing on headed work blanks a work operation by a tool fed axially toward the unheaded end portion of each successive blank clamped at a work station, a work head assembly comprising: adjustable base means including a fixed member and a base member adjustably secured thereto for adjustment parallel to a vertical plane; radial work clamping vise means supported by the base member including a pair of opposed radial clamping jaws, a vise frame adjustably mounted on one side of said base member for adjustment parallel to said plane and having a slideway formation disposed generally horizontally and parallel to said plane in which at least one of said jaws is movable toward and away from the other jaws, and means biasing said one jaw toward the other into radial blank clamping relation, said jaws having opposed end faces thereof mutually formed to define a work station and adapted to clamp cooperatively therein a work blank radially below the head with axis disposed perpendicular to said plane and with the underside of the head supported against axial thrust, said jaws also having camming surface portions convergent toward said station engageable by a work blank injected between said jaws into the work station for separating the jaws and releasing a previously clamped blank; axial head clamping means including a head clamp element reciprocable in the base member perpendicular to said plane adapted to engage axially a blank head and clamp it against said jaws, a spring biasing the clamp element away from said jaws, a fluid operated cylinder unit mounted on said base member as motor means bearing on the head clamp element to move the element into head clamping engagement; and blank feeding and escapement means including a slide structure vertically reciprocably mounted on said one side of the base member and carrying a blank engaging portion to move from a locus spaced from said jaws inwardly between the camming portions of the jaws in a blank injection stroke, spring means biasing the slide in one direction, fluid operated cylinder means having a horizontally acting element and being mounted on said fixed member to move the slide in the opposite direction, a motion converting mechanism mounted on the adjustable base member and linked to said slide for converting the horizontal action of the last named cylinder means into vertical slide motion, feed track means supported by said base member and having an outlet discharging between said locus and said jaws, the track means being adapted to receive and hold a series of blanks in soldiered array and discharge each blank with head disposed toward the head clamp, and stop means cooperating with the track means to position a discharged blank in the path of the slide adjacent the camming portions of the jaws and blocking discharge of a succeeding blank; said horizontally acting element having a vertical surface bearing on an element of said converting mechanism for force transmission, whereby the base member with axial head clamping means, radial clamping vise means and feed track means may be adjusted as a unit relative to said fixed member.

16. A work head assembly as described in claim 15, wherein said slide structure carries means adapted to clear chips from said head clamp element.

17. In a machine performing on headed work blanks a work operation by a tool fed axially toward the unheaded end portion of each successive blank clamped at a work station, a work head assembly comprising a pair of opposed jaws adapted to engage therebetween the shank of a blank in fixed axial disposition defining a work station, said jaws being adapted to support the underside of a blank head against axial thrust, means forcing one jaw toward the other into blank clamping relation, blank feeding and transfer-escapement means for injecting successive blanks moved perpendicular to the blank axis between said jaws, axial head clamping means including a head clamp element to clamp a blank head against said jaws and means biasing the head clamp element toward a retracted non-clamping position with close operating clearance relative to the head location of a blank clamped between the jaws, head clamping pneumatic cylinder means having a movable member thereof in constant contact with said head clamp element, pneumatic cylinder means and a motion multiplying mechanism for actuating said feeding and escapement means, and quick acting and releasing pneumatic control valve means mounted on the clamping cylinder means, whereby are minimized the blank transfer time and air consumption of the pneumatic cylinder means in operation of the machine.

18. In a machine for axially drilling or tapping a rivet or like headed work blank, clamping means for holding the blank against rotation in fixed position comprising a pair of opposed radial clamping jaws with radial clamping faces mutually shaped to provide therebetween a work blank shank clamping seat formation and a camming formation convergent toward said seat formation engageable by a blank shank translated radially into said seat formation to cam said jaws apart, one of said jaws being movable toward and away from the clamping face of the other, spring means for biasing the movable jaw toward the other to supply a radial blank clamping force maintaining the blank between the jaws and to permit the biased jaw to move away from the other upon radial injection of a blank therebetween, and axial head clamping means including a head clamp element adapted to engage and clamp a blank head against said jaws and also including fluid cylinder means for applying the primary clamping force through said clamp element axially upon the blank head.

19. In a machine performing on headed work blanks a work operation by a tool fed toward the unheaded end portion of each successive blank clamped at a work station, a work head assembly comprising: a base member, radial work clamping vise means supported by the base member including a pair of opposed radial clamping members, a vise frame mounted on one side of said base member having a slideway formation disposed generally horizontally in which at least one of said clamping members is movable toward and away from the other clamping member, means biasing the movable clamping member toward the other clamping member into radial blank clamping relation, said clamping members having opposed end faces thereof mutually adapted to clamp to provide a seat formation for cooperatively clamping a work blank radially below the head with axis disposed perpendicular to said slideway and to define a work station, the movable clamping member having a camming surface leading toward the seat formation thereon engageable by a work blank carried between said clamping members into the work station to displace the movable member against the biasing means, axial head clamping means including a head clamp element reciprocable in the base member perpendicular to said slideway adapted to engage axially a blank head and clamp it against said clamping members, a spring biasing the clamp element away from said clamping members, a fluid operated cylinder parallel to the direction of reciprocation of the head clamping engagement; and blank feeding and escapement means including feed track means having an outlet and being adapted to receive and hold a series of blanks in soldiered array and discharge each blank with like orientation, and blank transfer means mounted on said base member to transfer a blank from the track outlet over said camming surface into said work station.

20. The combination of claim 19, wherein the head clamping means includes a pneumatic cylinder unit slideably supported on guide rods extending from the side of said base member opposite the said one side in a direction parallel to the direction of reciprocation of the head clamp element, said spring biasing the clamp element into constant contact with a piston element of the pneumatic cylinder unit, a locking ring adjustably axially secured on and relative to the cylinder unit but rotatable relative thereto, said ring at one rotation position being interlocked with the guide rods to prevent axial movement away from the clamp element and at another position released from the guide rods to permit withdrawal of the unit away from the clamp element.

References Cited in the file of this patent

UNITED STATES PATENTS

| | | |
|---|---|---|
| 361,832 | Morrison et al. | Apr. 26, 1887 |
| 1,846,645 | Lach | Feb. 23, 1932 |
| 2,622,488 | Payne | Dec. 23, 1952 |

UNITED STATES PATENT OFFICE

CERTIFICATE OF CORRECTION

Patent No. 2,811,876　　　　　　　　　　　　　　　　　November 5, 1957

James W. Batchelder

It is hereby certified that error appears in the printed specification of the above numbered patent requiring correction and that the said Letters Patent should read as corrected below.

Column 14, line 74, strike out "not"; column 16, line 48, for "blank and head" read -- blank head --; column 20, line 72, strike out "to clamp".

Signed and sealed this 14th day of January 1958.

(SEAL)
Attest:

KARL H. AXLINE
Attesting Officer

ROBERT C. WATSON
　　　　　　　　　　　　　　　　　　　　　　　　　Commissioner of Patents